(No Model.)
H. H. SPEARS.
CLOVER SEED HARVESTER.
No. 292,377. Patented Jan. 22, 1884.
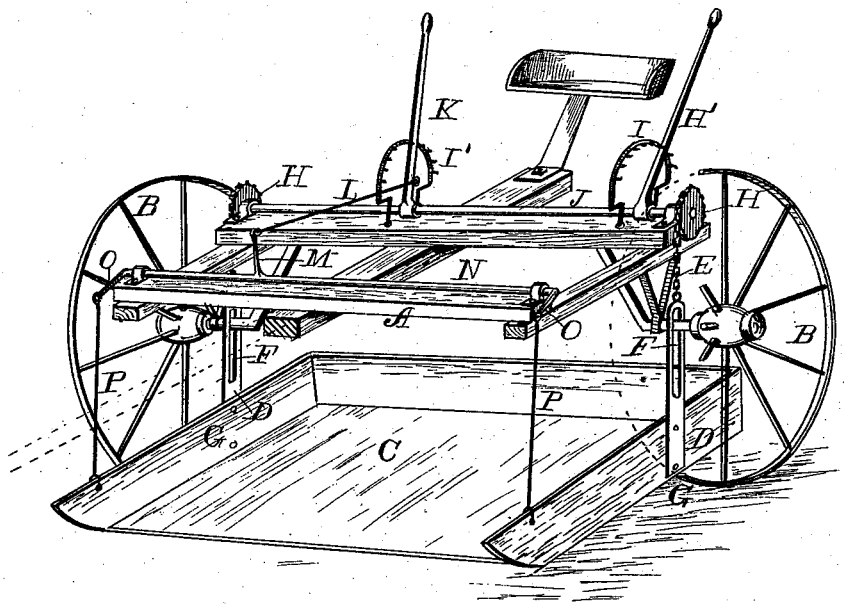

UNITED STATES PATENT OFFICE.

HENRY H. SPEARS, OF PARIS, KENTUCKY.

CLOVER-SEED HARVESTER.

SPECIFICATION forming part of Letters Patent No. 292,377, dated January 22, 1884.

Application filed July 13, 1883. (No model.)

*To all whom it may concern:*

Be it known that I, HENRY H. SPEARS, of Paris, in the county of Bourbon and State of Kentucky, have invented a new and useful Improvement in Clover-Seed Harvesters, which improvement is fully set forth in the following specification and accompanying drawing, in which the figure is a side elevation of the machine.

The object of my invention is to provide a simple and efficient means for raising, lowering, and inclining the bed or body of a clover-seed header or stripper; and is an improvement on my previous application for this same purpose.

In the accompanying drawing, A represents the frame, made in a suitable manner, and mounted on wheels B. The body C is designed to have on its forward end the teeth for stripping or heading the clover; but the mechanism is not the essential feature of the present invention, and is not therefore shown. The body C is suspended beneath the axle by means of two arms or guides D. Each arm or guide is provided with a slot, F, through which the axle passes, and the upper end is equipped with a chain, E, which passes over a sprocket-wheel, H. The lower ends of the arms or guides are securely attached to the body C, as shown at G.

H H represent the sprocket-wheels secured to the cross-shaft J, one at each end. H' is a lever secured to the cross-shaft J. This lever engages with notches on the side of the arch I.

K is a lever hinged centrally in a loose manner to the shaft J, but so arranged as not to work laterally on the shaft J. This lever engages with notches on the arch I'. Attached to this lever K is a link, L, whose opposite end is connected with a crank, M, on the rod or rock-shaft N. This rod or rock-shaft N, having the crank M, extends transversely across the forward post of the frame A, and is provided at each end with a crank, O. A rod, P, is attached to each of these cranks, and the lower ends of these rods are in turn attached to the forward ends of the bed C.

When it is desired to raise the rear end of the bed, the lever H', carrying the rock-shaft J, sprocket-wheel H, and lever D, secured to the bed C, is pulled backward. When it is desired to lower it, the lever is reversed.

When it is desired to raise the forward end of the bed C, the lever K, which is attached to the crank M, and carrying the rod or rock-shaft N and rods P, is moved backward, and also when it is desired to lower the bed the lever is reversed.

As will be seen, the levers, connecting both with the front and rear ends of the bed, and being in a convenient position, enable the operator to manipulate the body of the machine, as may be desired.

The chain and sprocket-wheel connections of the body C, with the draft-frame A, possess advantages over rigid rack-bars and pinions with back supports or guides for the rack-bars, as shown in my Letters Patent No. 278,286 of 1883.

The chains and sprocket-wheels are cheaper, simpler, more easily operated, and allow a greater freedom of movement to the body C than said rack-bars.

What I claim is—

The combination of the frame A, mounted on wheels, the cross-shaft J, provided with a sprocket-wheel on each end, the suspension-chains, the slotted guides, the body C, the lever H', rigid on shaft J, the lever K, loose on said shaft, rock-shaft N, its rod-connection with loose lever K, and the suspension-rods P, all constructed and adapted to operate substantially as described.

In testimony that I claim the foregoing, I have hereunto set my hand this 9th day of July, 1883, in the presence of witnesses.

HENRY H. SPEARS.

Witnesses:
JOHN S. SMITH,
DAVIS HATCHCRAFT.